(12) United States Patent
Kern et al.

(10) Patent No.: US 11,734,099 B2
(45) Date of Patent: Aug. 22, 2023

(54) CORRELATING SERVER POWER AND SERVER UTILIZATION FOR DERIVING BILLING FROM POWER CONSUMPTION DATA

(71) Applicant: LENOVO Enterprise Solutions (Singapore) PTE. LTD., New Tech Park (SG)

(72) Inventors: Eric Richard Kern, Chapel Hill, NC (US); James Patrick Sigmon, Wilson, NC (US)

(73) Assignee: Lenovo Enterprise Solutions (Singapore) Pte. Ltd., New Tech Park (SG)

(*) Notice: Subject to any disclaimer, the term of this patent is extended or adjusted under 35 U.S.C. 154(b) by 0 days.

(21) Appl. No.: 17/589,213

(22) Filed: Jan. 31, 2022

(65) Prior Publication Data

US 2022/0156135 A1    May 19, 2022

Related U.S. Application Data

(63) Continuation of application No. 16/569,867, filed on Sep. 13, 2019, now Pat. No. 11,461,161.

(51) Int. Cl.
| | | |
|---|---|---|
| *G06F 11/00* | (2006.01) | |
| *G06F 11/07* | (2006.01) | |
| *G06N 3/08* | (2023.01) | |
| *G06N 3/04* | (2023.01) | |

(52) U.S. Cl.
CPC ........ *G06F 11/079* (2013.01); *G06F 11/0709* (2013.01); *G06F 11/0751* (2013.01); *G06F 11/0772* (2013.01); *G06N 3/04* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 9,495,272 B2 | 11/2016 | Elting et al. | |
| 10,346,239 B1 | 7/2019 | Ortega Gutierrez et al. | |
| 2009/0157508 A1* | 6/2009 | Illingworth | ............ G06Q 40/00 705/14.23 |
| 2009/0271046 A1* | 10/2009 | Lewis | ...................... G06F 11/30 713/340 |
| 2010/0094652 A1* | 4/2010 | Dorsett | .................. G16H 40/67 726/1 |
| 2010/0332661 A1 | 12/2010 | Tameshige | |

(Continued)

OTHER PUBLICATIONS

Google Scholar/Patents search—text refined (Year: 2022).*

(Continued)

*Primary Examiner* — Christopher S McCarthy
(74) *Attorney, Agent, or Firm* — Kunzler Bean & Adamson; Bruce R. Needham

(57) ABSTRACT

A method for billing server utilization based on power includes receiving power consumption data of a remote server used by a customer, deriving a power-utilization correlation between power consumption of the remote server with utilization of the remote server, determining utilization of the remote server from the power consumption data and the power-utilization correlation, preparing a bill for the customer based on the determined utilization of the remote server, and sending the bill to the customer.

19 Claims, 7 Drawing Sheets

(56) References Cited

U.S. PATENT DOCUMENTS

| | | |
|---|---|---|
| 2014/0006815 A1 | 1/2014 | Castro-Leon et al. |
| 2014/0195178 A1 | 7/2014 | Gatts et al. |
| 2016/0202744 A1* | 7/2016 | Castro-Leon ......... G06F 9/5094 713/310 |
| 2020/0210304 A1 | 7/2020 | Wang et al. |

OTHER PUBLICATIONS

Google Scholar/Patents search—text refined (Year: 2023).*
Google Scholar Patents/Scholar search—text refined (Year: 2023).*
U.S. Appl. No. 16/569,867, "Office Action Summary", USPTO, dated Dec. 14, 2021, pp. 1-11.

* cited by examiner

CORRELATING SERVER POWER AND SERVER UTILIZATION FOR DERIVING BILLING FROM POWER CONSUMPTION DATA

CROSS-REFERENCE TO RELATED APPLICATIONS

This is a continuation application of and claims priority to U.S. patent application Ser. No. 16/569,867 entitled "USING SERVER POWER TO PREDICT FAILURES" and filed on Sep. 13, 2019 for Eric Richard Kern, et al., which is incorporated herein by reference.

FIELD

The subject matter disclosed herein relates to predicting failures in a server and more particularly relates to using server power measurements in predicting failures in a server.

BACKGROUND

Often it is advantageous for a business to lease computing equipment rather than outright purchase of the computing equipment. A vendor of servers and other datacenter equipment is often in a better position than the business owner to install and maintain servers and other computing equipment. The vendor can increase or decrease computing resources while maintaining installed servers, switches, racks, etc.

One issue that plagues servers and other computing equipment is failure of the equipment where vendor resources may be distant and repair may take time, which may result in loss of computing resources for the business until repairs are made. Predicting server and other equipment failures are typically handled though health alerts that identify problems of the servers where some of the problems may indicate an upcoming component failure.

BRIEF SUMMARY

A method for using server power to predict failures is disclosed. An apparatus and computer program product also perform the functions of the method. The method includes receiving power consumption data and health alerts of a remote server, analyzing the power consumption data of the remote server to determine trends in the power consumption data, and comparing the trends in the power consumption data and the health alerts with a server failure model. The server failure model is derived from historical power consumption data and health alerts associated with one or more servers of a same type as the remote server. The method includes predicting a failure in the remote server based on the comparison between the trends in the power consumption data and the health alerts and the server failure model and sending an alert in response to the predicted failure. The alert indicates the predicted failure.

An apparatus for using server power to predict failures includes a processor and a memory that stores code executable by the processor to receive power consumption data and health alerts of a remote server, analyze the power consumption data of the remote server to determine trends in the power consumption data and compare the trends in the power consumption data and the health alerts with a server failure model. The server failure model is derived from historical power consumption data and health alerts associated with one or more servers of a same type as the remote server. The apparatus includes executable code to predict a failure in the remote server based on the comparison between the trends in the power consumption data and the health alerts and the server failure model and to send an alert in response to the predicted failure. The alert indicates the predicted failure.

A program product includes a computer readable storage medium that stores code executable by a processor. The executable code includes code to receive power consumption data and health alerts of a remote server, analyze the power consumption data of the remote server to determine trends in the power consumption data and compare the trends in the power consumption data and the health alerts with a server failure model. The server failure model is derived from historical power consumption data and health alerts associated with one or more servers of a same type as the remote server. The code is further executable to predict a failure in the remote server based on the comparison between the trends in the power consumption data and the health alerts and the server failure model and to send an alert in response to the predicted failure. The alert indicates the predicted failure.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
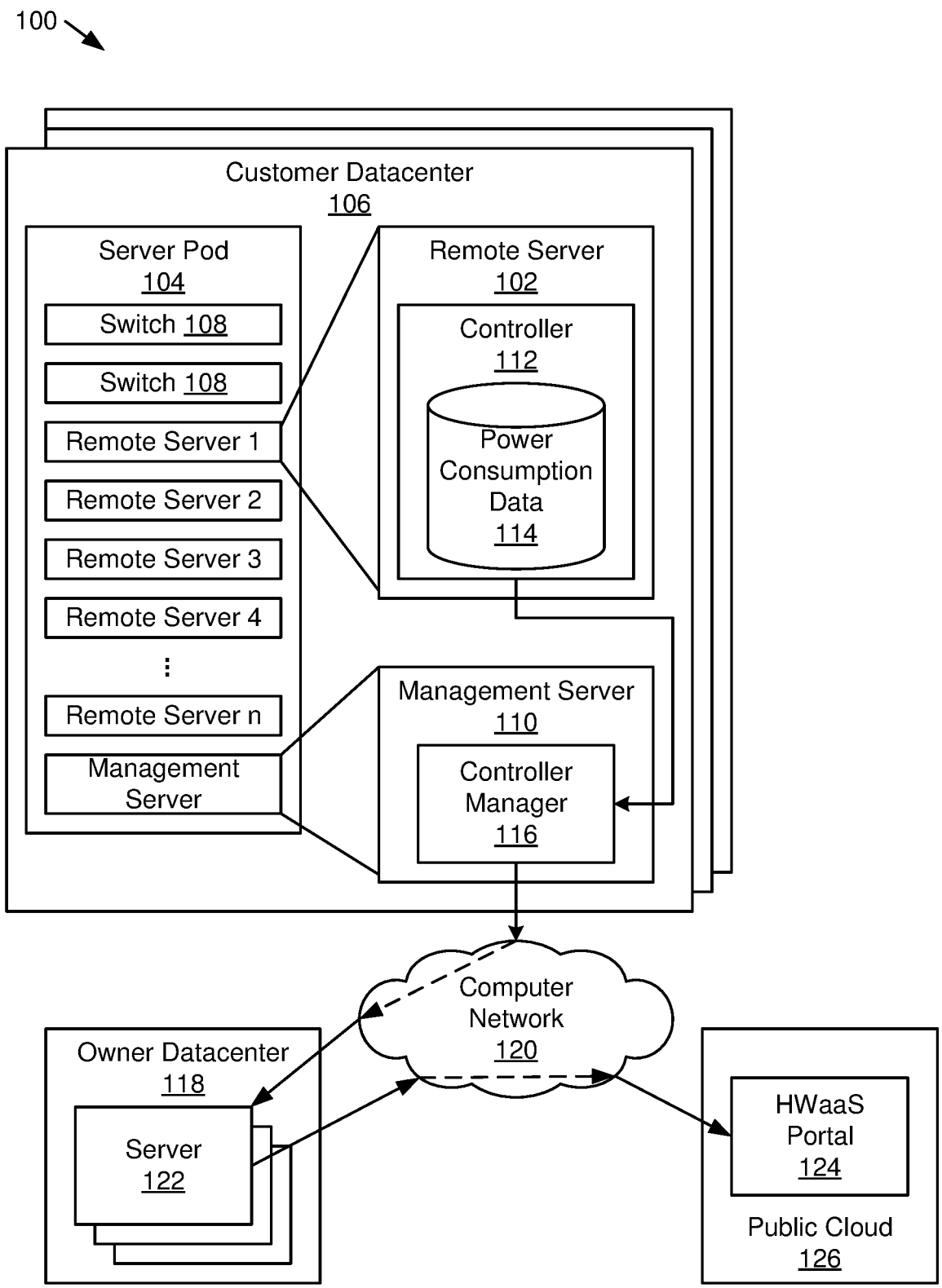
FIG. 1 is a schematic block diagram illustrating a system for predicting server failures, according to various embodiments.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory (EPROM or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("$WAN$"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented b special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

A method for using server power to predict failures is disclosed. An apparatus and computer program product also perform the functions of the method. The method includes receiving power consumption data and health alerts of a remote server, analyzing the power consumption data of the remote server to determine trends in the power consumption data, and comparing the trends in the power consumption data and the health alerts with a server failure model. The server failure model is derived from historical power consumption data and health alerts associated with one or more servers of a same type as the remote server. The method includes predicting a failure in the remote server based on the comparison between the trends in the power consumption data and the health alerts and the server failure model and sending an alert in response to the predicted failure. The alert indicates the predicted failure.

In some embodiments, the method includes gathering server failure data of servers of the same type as the remote server from the health alerts and constructing the server failure model using server failure data, the trends in the power consumption data, and the health alerts. In other embodiments, the method includes using a deep neural network to construct the server failure model and determining the trends in power consumption data of the remote server, where the deep neural network is trained using the power consumption data of the remote server and the health alerts of the remote server. In other embodiments, the method includes combining the power consumption data of the remote server with previous power consumption data to determine a current total power consumption of the remote server, where predicting a failure in the remote server is further based on the current total power consumption of the remote server. In other embodiments, the server failure model includes a correlation between total power consumption of one or more servers of a same type as the remote server with server failures, health alerts, and trends in power consumption of the one or more servers of the same type as the remote server.

In some embodiments, receiving the power consumption data and the health alerts includes decrypting the power consumption data and the health alerts and storing the power consumption data and the health alerts in a computer readable storage device accessible for at least analyzing the power consumption data and predicting the failure. In other embodiments, the method includes measuring, by use of a controller at the remote server, power consumption in the remote server at a power sampling rate and storing the power consumption data prior transmittal to a processor that receives the power consumption data at a data transmission rate, where the sampling rate is more frequent than the data transmission rate. In other embodiments, storing the power consumption data is in a first-in/first-out ("FIFO") buffer, where the FIFO buffer has a capacity to store measurements of power consumption data for a time period at least twice as much as the data transmission rate.

In some embodiments, the remote server is leased and the method includes calculating a bill for a user of the remote server from the power consumption data and transmitting the bill to the user, where the bill is for leasing the remote server and is calculated based on the power consumption data. In other embodiments, the prediction of the failure includes an identification of which component in the remote server is about to fail and the alert includes a notification of which component in the remote server is about to fail. In other embodiments, the power consumption data includes power consumption data of a plurality of components within the remote server and the health alerts each include an indication of which component in the remote server the health alert pertains.

An apparatus for using server power to predict failures includes a processor and a memory that stores code executable by the processor to receive power consumption data and health alerts of a remote server, analyze the power consumption data of the remote server to determine trends in the power consumption data and compare the trends in the power consumption data and the health alerts with a server failure model. The server failure model is derived from historical power consumption data and health alerts associated with one or more servers of a same type as the remote server. The apparatus includes executable code to predict a failure in the remote server based on the comparison between the trends in the power consumption data and the health alerts and the server failure model and to send an alert in response to the predicted failure. The alert indicates the predicted failure.

In some embodiments, the code is further executable by the processor to gather server failure data of servers of the same type as the remote server from the health alerts and to construct the server failure model using server failure data, the trends in the power consumption data, and the health alerts. In other embodiments, the code is further executable by the processor to use a deep neural network to construct the server failure model and to determine the trends in power consumption data of the remote server, where the deep neural network is trained using the power consumption data of the remote server and the health alerts of the remote server. In other embodiments, the code is further executable by the processor to use a deep neural network to combine the power consumption data of the remote server with previous power consumption data to determine a current total power consumption of the remote server. Predicting a failure in the remote server is further based on the current total power consumption of the remote server and the server failure model includes a correlation between total power consumption of one or more servers of a same type as the remote server with server failures, health alerts, and trends in power consumption of the one or more servers of the same type as the remote server.

In some embodiments, the code is further executable by the processor to receive the power consumption data and the health alerts includes code executable by the processor to decrypt the power consumption data and the health alerts and to store the power consumption data and the health alerts in a computer readable storage device accessible for at least analyzing the power consumption data and predicting the failure. In other embodiments, the code is further executable by the processor to measure, by use of a controller at the remote server, power consumption in the remote server at a power sampling rate and to store the power consumption data prior transmittal to a processor that receives the power consumption data at a data transmission rate. The sampling rate is more frequent than the data transmission rate and storing the power consumption data is in a FIFO buffer that has a capacity to store measurements of power consumption data for a time period at least twice as much as the data transmission rate.

In some embodiments, the remote server is leased and the code is further executable by the processor to calculate a bill for a user of the remote server from the power consumption data and to transmit the bill to the user where the bill is for leasing the remote server and is calculated based on the power consumption data. In other embodiments, the prediction of the failure includes an identification of which component in the remote server is about to fail and the alert includes a notification of which component in the remote server is about to fail and the power consumption data includes power consumption data of a plurality of components within the remote server and the health alerts each include an indication of which component in the remote server the health alert pertains.

A program product includes a computer readable storage medium that stores code executable by a processor. The executable code includes code to receive power consumption data and health alerts of a remote server, analyze the power consumption data of the remote server to determine trends in the power consumption data and compare the trends in the power consumption data and the health alerts with a server failure model. The server failure model is derived from historical power consumption data and health alerts associated with one or more servers of a same type as the remote server. The code is further executable to predict a failure in the remote server based on the comparison between the trends in the power consumption data and the health alerts and the server failure model and to send an alert in response to the predicted failure. The alert indicates the predicted failure.

FIG. 1 is a schematic block diagram illustrating one embodiment of a system 100 for predicting server failures. The system 100 includes one or more remote servers 102a-n (generically or collectively "102") in a server pod 104 at a customer datacenter 106 or other customer facility. The remote servers 102 are remote from an owner's facility where the owner (lessor), in some embodiments, owns the remote servers 102 and leases the remote servers 102 to a customer (lessee). In some embodiments, the owner maintains the remote servers 102 and bills the customer based on usage of the remote servers 102. The server pod 104, in some embodiments, includes switches 108 and may be mounted in one or more racks. The server pod 104 may also include power supplies (not shown), data storage devices (not shown), and other equipment known to those of skill in the art.

In some embodiments, the server pod 104 includes a management server 110 which controls various aspects of the remote servers 102. In some examples, the management server 110 is a baseboard management controller ("BMC") or a controller that manages BMCs in the remote servers 102. The management server 102, in some embodiments, monitors internal physical variables in the remote servers 102, such as temperature, humidity, power supply voltage, fan speeds, communication parameters, operating system ("OS") functions, and the like. For example, the management server 110 may establish a virtual machine ("VM"), may allocate server resources to the VM, may initiate an OS instance in the VM, may route or assign jobs to the VM, etc. One of skill in the art will recognize other ways that a management server 110 functions with respect to the remote servers 102.

In one embodiment, the remote servers 102 each include a controller 112 that measures and stores power consumption data 114 of the remote server 102. In some examples, the controller 112 is a BMC. In other embodiments, the controller 112 is an XClarity® controller by Lenovo® or a controller with similar functionality. The controller 112, in some embodiments, monitors overall power consumption of the remote server 102 in which it resides, such as server input power. In other embodiments, the controller 112 monitors power consumption of various components of the remote server 102. For example, the controller 112 may measure CPU power, a memory power, graphical processor unit ("GPU"), fan power, and the like and stores the power consumption data 114.

In some embodiments, the management server 110 includes a controller manager 116 that collects power consumption data 114 from each server and transmits the power consumption data 114 to a server 122 of an owner datacenter 118 (i.e. datacenter of the lessor) over a computer network 120. In some examples, the controller manager 116 is an XClarity® Administrator that manages several remote servers 102 and associated controllers 112. In some embodiments, the controller manager 116 periodically transmits power consumption data 114 to a server 122 in the owner datacenter 118 over the computer network 120. For example, the controller manager 116 may transmit power consumption data 114 to a server 122 of the owner on a daily basis, twice day or other data transmission rate.

In some embodiments, the computer network 120 is local area network ("LAN"), a wide area network ("WAN"), a fiber network, a wireless network, a cellular network, the Internet, etc. and may also include a combination of network types. The computer network 120 includes data cables, servers, switches, routers, and/or other networking equipment.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

In some embodiments, the server 122 of the owner datacenter 118 processes power consumption data 114 to create pricing information, which is sent to a hardware-as-a-service ("HWaaS") portal 124 in a public cloud 126 for creation of a bill to be sent to the customer. In other embodiments, bills are created and sent from within the owner datacenter 118. In some embodiments, the HWaaS portal 124 is a Lenovo TruScale™ portal, which is part of a pay-for-what-you-use datacenter technology that charges the customer based on actual use of the remote servers 102. In some embodiments, actual use is based on CPU utilization. For example, a lightly loaded remote server 102 may be charged less than a heavily loaded remote server 102.

Figure 7:
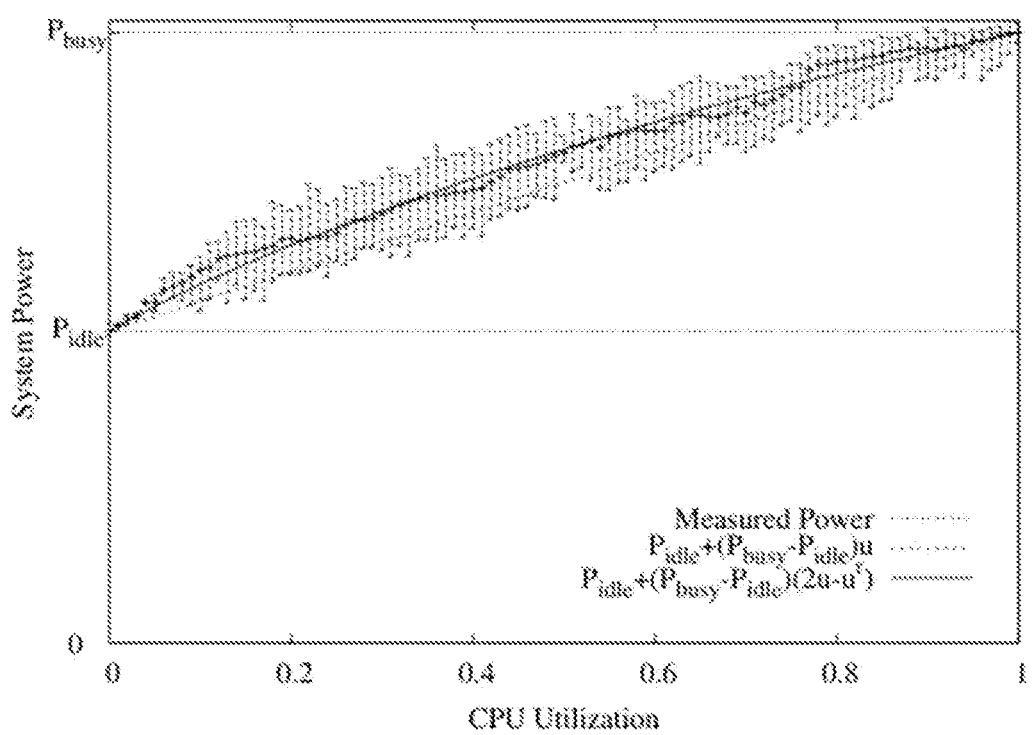
FIG. 7 is a graph depicting correlation between central processing unit ("CPU") utilization and system power consumption, according to various embodiments.

While traditional billing may charge based on monitoring CPU utilization, power consumption data 114 may be used for customer billing. FIG. 7 is a graph depicting correlation between CPU utilization and system power consumption. The horizonal axis is CPU utilization and the vertical axis is system power. As can be seen in the graph, system power correlates very closely to CPU utilization between a no load condition (CPU utilization of 0) where a minimal amount of power is used and depicted as $P_{idle}$, and a fully loaded condition (CPU utilization is 1) where a maximum amount of power is used and depicted as $P_{busy}$. Basing customer billing of usage of a remote server 102 on power consumption of the remote server 102 provides a simple, straightforward method of indirectly measuring CPU utilization that correlates nicely to system power, which is readily available as a measured value.

Collecting power consumption data 114 of a remote server 102 also provides information that can be used along with health alerts to predict server failures, which allows the owner to be prepared for an upcoming failure in a remote server 102. In some embodiments, the controller 112 and/or controller manager 116 send health alerts to the owner datacenter 118 for analysis and action. A health alert includes minor issues, such as an unexpected temperature rise, a memory fault, a reset of a component, an error message of a component, or other abnormal condition, and also includes failures, such as a failure of a CPU, a failure of a fan, a memory failure, etc. Typically, the controller 112 and/or controller manager 116 send health alerts on a different schedule than power consumption data 114. In some embodiments, health alerts are sent when they are generated without intentional delay. In other embodiments, less important health alerts are sent on a schedule. In some embodiments, the controller 112 and/or controller manager 116 encrypt the health alerts before sending. Predicting server failures based on power consumption data and health alerts is explained in more detail below with respect to FIGS. 4-6.

Figure 2:
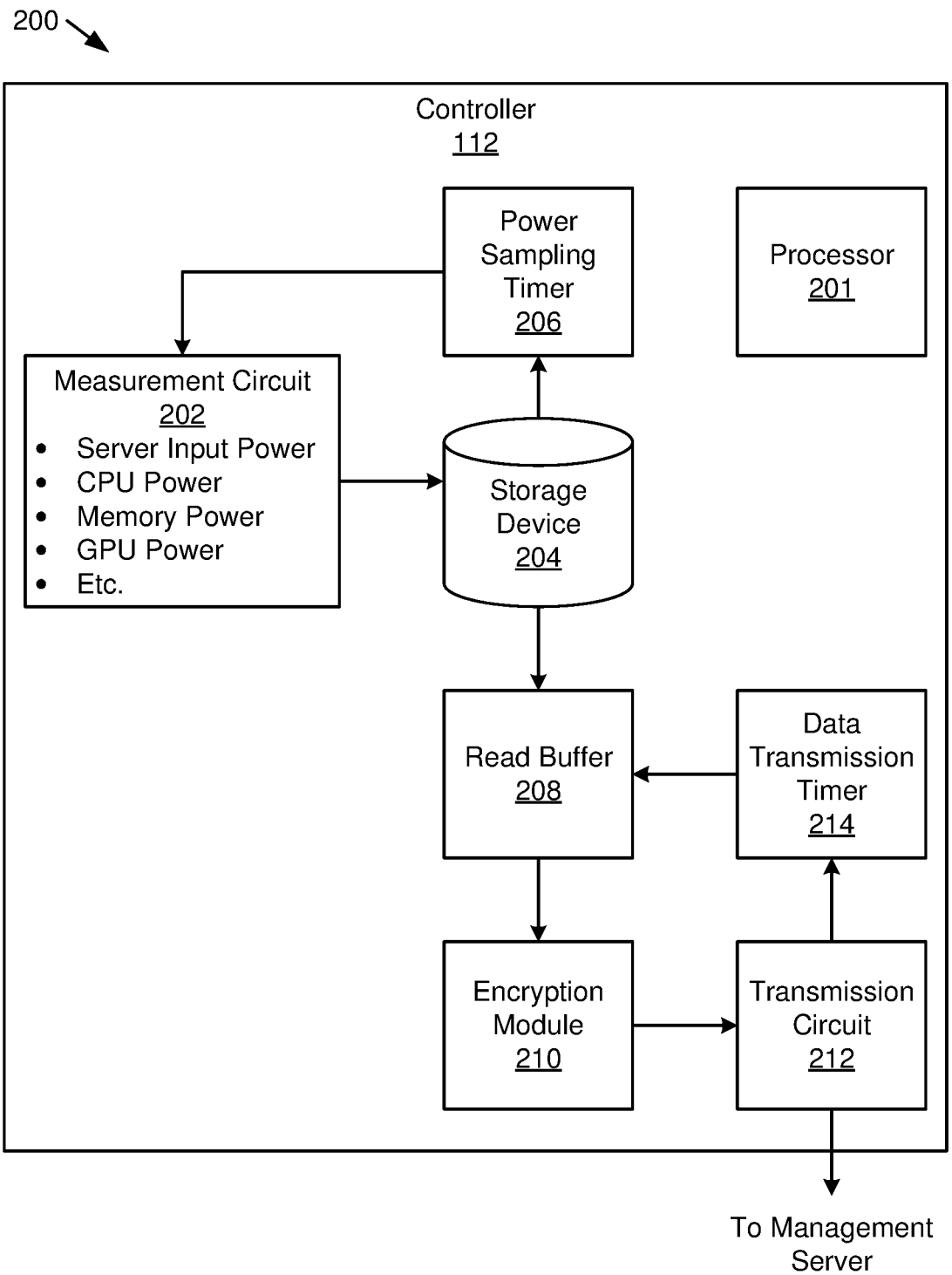
FIG. 2 is a schematic block diagram illustrating an apparatus for power consumption data sampling in a controller of a remote server, according to various embodiments.

FIG. 2 is a schematic block diagram illustrating one embodiment of an apparatus 200 for power consumption data sampling in a controller of a remote server 102. The apparatus 200 is an expanded view of the controller 112 of the remote server 102 in the system 100 of FIG. 1. A processor 201 of the controller 112 controls implementation of measuring power of the remote server 102 and other functions depicted in FIG. 2. The apparatus 200 includes a measurement circuit 202 that measures power in the remote server 102 to produce power consumption data 114. In some embodiments, the measurement circuit 202 measures input power to the remote server 102. In other embodiments, the measurement circuit 202 measures power for components in the remote server 102. The components may be CPU power, memory power, GPU power, fan power, core power, storage device power, and the like. Measuring power for components, coupled with health alerts regarding components in the remote server 102, provides a unique correlation that is useful in predicting component failure and failure of the overall remote server 102.

In some embodiments, the measurement circuit 202 reads power from measurements that are available from components of the remote server 102. In other embodiments, the measurement circuit 202 includes hardware for power measurements. The power measurements typically include measuring current and voltage. In some embodiments, where voltage is known, the measurement circuit 202 only measures current of a component.

In some embodiments, the measurement circuit 202 includes appropriate equations for power measurement. For example, the measurement circuit 202 may measure direct current ("DC") voltage and current and may multiply voltage and current to get a power measurement. In other embodiments, the measurement circuit 202 measures alternating current ("AC") voltage and current and accounts for power factor. In some embodiments, the measurement circuit 202 uses hardware circuits to determine power. In other embodiments, the measurement circuit 202 receives measurements and uses a processor and executable code to determine power from the measurements. One of skill in the art will recognize other ways for the measurement circuit 202 to measure power of various components and input power of the remote server 102.

The apparatus 200 includes a storage device 204 that stores power consumption data 114. In some embodiments, the storage device 204 includes voltage storage, such as a register, random access memory ("RAM"), and the like. In other embodiments, the storage device 204 is a non-volatile storage device, such as flash memory, etc. In some embodiments, the storage device 204 inputs new power consumption data 114 and removes the oldest power consumption data 114. In one example, the storage device 204 is a first-in-first-out ("FIFO") buffer where when new power consumption data 114 is input, the oldest power consumption data 114 is forced out.

In some embodiments, measurement circuit 202 measures power at a particular sampling rate and the storage device 204 stores a particular amount of power measurement samples. For example, the sampling rate may be 30 seconds, 1 minute, 2 minutes, etc. and the storage device 204 holds several minutes or several hours of power measurement samples. The sampling rate may be very short, for example on a microsecond level, or may be longer, such as on the minute, tens of minutes, or hour scale, as appropriate for the remote servers 102. In some embodiments, power consumption data 114 in the storage device 204 is read at a particular data transmission rate and the frequency of power measurement samples is greater than the data transmission rate. In some embodiments, the storage device 204 stores enough power measurement samples to cover two transmissions of power consumption data 114. For example, if the data transmission rate is every 6 hours, the storage device 204 holds at least 12 hours of power consumption data 114, which provides a safety mechanism so that if a particular transmission of power consumption data 114 fails, a next transmission of power consumption data 114 will cover power consumption data 114 missing from the previous transmission of power consumption data 114.

In some embodiments, the apparatus 200 includes a power sampling timer 206 that sets a measurement rate for the measurement circuit 202. For example, the power sampling timer 206 may be set at 30 seconds after every measurement by the measurement circuit 202 so that at when the power sampling timer 206 counts down to zero or up to the power sampling rate, the power sampling timer 206 sends a signal to the measurement circuit 202 to take another sample of power consumption data 114. In some embodiments, the power sampling timer 206 is a hardware timer. In other embodiments, the power sampling timer 206 is a software time executed by a processor.

The apparatus 200, in some embodiments, includes a read buffer 208 that holds power consumption data 114 from the storage device 204 prior to transmission of the power consumption data 114. For example, the controller 112 may transfer data from the storage device 204 5o the read buffer 208 to create a snapshot of power consumption data 114 to be transmitted. In one embodiment, all of the power consumption data 114 is read from the storage device 204 and stored in the read buffer 208. In other embodiments, the controller 112 transfers enough data from the storage device 204 to the read buffer 208 to just cover a period from a previous transmission of power consumption data 114. In the embodiment, if a transmission fails, the controller 112 may attempt to transmit power consumption data 114 again so that no data is lost. In embodiments where the controller 112 transmits enough power consumption data 114 to cover twice the data transmission rate, an alert may be sent to correct transmission issues before a next data transmission. One of skill in the art will recognize other ways to not lose data due to a data transmission failure.

The apparatus 200 optionally includes an encryption module 210 that encrypts data from the read buffer 208 prior to transmission. In one embodiment, the encryption module 210 includes one or more hardware circuits for encrypting data. In other embodiments, the encryption module 210 includes executable code and encryption of data from the read buffer 208 is accomplished by the processor 201 executing the code. In another embodiment, the encryption module 210 includes instructions in a programmable hardware device. One of skill in the art will recognize other ways to implement the encryption module 210. The encryption module 210 encrypts power consumption data 114 prior to transmission for security purposes and encryption methods are known in the art.

The apparatus 200 includes a transmission circuit 212 that transmits the power consumption data 114 after encryption to the controller manager 116 of the management server 110. The transmission circuit 212 may include transmission over a data bus and includes hardware circuits necessary for safe transmission of the power consumption data 114 to the controller manager 116. In some embodiments, where the controller manager 116 is connected securely to the controller 112, the power consumption data 114 may not be encrypted before sending to the controller manager 116 and encryption may be done by the controller manager 116. In the depicted embodiment, the power consumption data 114 is encrypted by an encryption module 210 in the controller 112 so that the power consumption data 114 does not need to be encrypted by the controller manager 116. In some examples, the transmission circuit 212 is connected to the controller manager 116 through a switch 108. In other embodiments, where transmission of the power consumption data 114 is over a network, the transmission circuit 212 is a network interface card ("NIC") or similar circuit The apparatus 200, in some embodiments, includes a data transmission timer 214 that sets a data transmission rate of the power consumption data 114 to the controller manager 116. For example, the data transmission rate may be every six hours, every eight hours, every twelve hours, once a day, etc. and the data transmission timer 214 stores and controls the data transmission rate. In some embodiments, a user interacts with the controller 112 and to set a data transmission rate in the data transmission timer 214. The data transmission timer 214 may be a hardware timer or a software timer or may include both hardware and software elements. For example, a software timer may interact with hardware to send a signal to the read buffer 208. Note that the devices 202-214 in FIG. 2 are conceptual and may be implemented in other ways to accomplish measuring power consumption of various components and/or input power to a remote server 102 at a particular sampling rate, storing a particular amount of the most recent samples, and then transmitting power consumption data to the controller manager 116 at a rate less than the power sampling rate.

Figure 3:
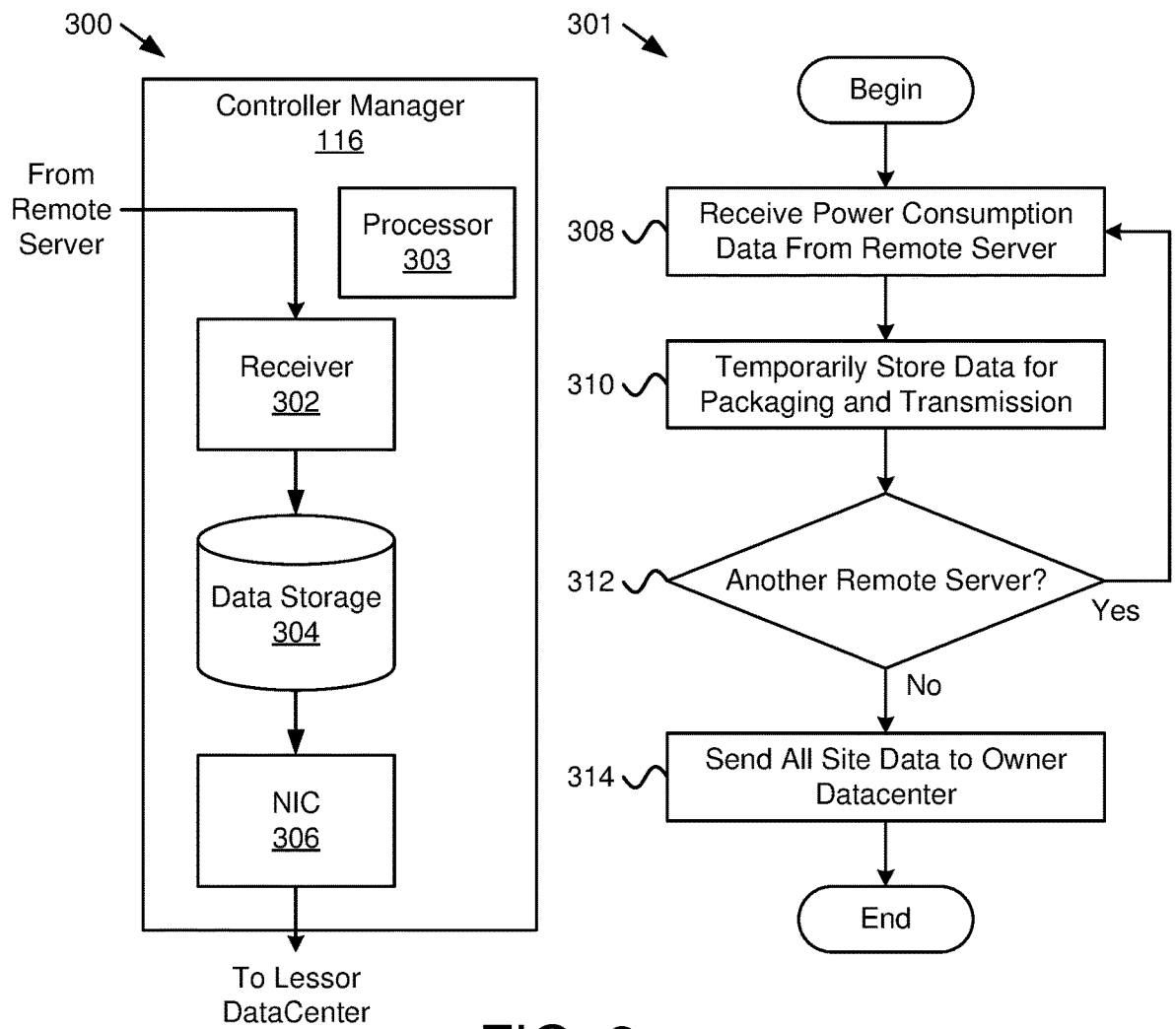
FIG. 3 is a schematic block diagram illustrating an apparatus and method for gathering power consumption data from a plurality of remote servers, according to various embodiments.

FIG. 3 is a schematic block diagram illustrating one embodiment of an apparatus 300 and method 301 for gathering power consumption data 114 from a plurality of remote servers 102. One or more steps of the method 301 may be executed on the processor 303 or may be implemented using a programmable hardware device and/or hardware circuits. The apparatus 300 includes a receiver 302 that receives power consumption data 114 from remote servers 102. In one example, the receiver 302 is connected to each remote server 102 in a server pod 104 or other group of remote servers 102, for example, through a switch 108. In other embodiments, the receiver 302 is connected to the remote servers 102 over a computer network and the receiver 302 is a NIC.

The apparatus 300 stores power consumption data 114 from each remote server 102 in a data storage device 304. The data storage device 304 is typically non-volatile storage, and may be solid-state storage, a hard disk drive, etc. In the depicted embodiment, the data storage device 304 stores encrypted power consumption data 114. The apparatus includes a NIC 306 that is an interface to the computer network 120, which facilitates the controller manager 116 to send the encrypted power consumption data 114 of several remote servers 102 to the owner datacenter 118 for analysis and billing. In other embodiments, the apparatus 200 of FIG. 2 sends power consumption data 114 and health alerts directly to the owner datacenter 118.

The method 301 for receiving and transmitting power consumption data 114 begins and receives 308 power consumption data 114 from a remote server (e.g. 102a) and temporarily stores 310 the power consumption data 114 in the data storage device 304. The method 301 then determines 312 if there is another remote server 102 from which to gather power consumption data 114. If the method 301 determines 312 that there is another remote server (e.g. 102b) with power consumption data 114, the method 301 returns and receives 308 power consumption data 114 from the remote server 102b. The method 301 continues and receives 308 from each remote server 102a-n and stores 310 the received power consumption data 114 in the data storage device 304. The method 301 sends 314 the power consumption data 114 from the site (e.g. customer datacenter 106) to the owner datacenter 118, and the method 301 ends. In one embodiment, the controller manager 116 sends 314 power consumption data 114 on a particular schedule. In another embodiment, the controller manager 116 sends 314 power consumption data 114 of the remote servers 102a-n once power consumption data 114 is received from all remote servers 102a-n.

Figure 4:
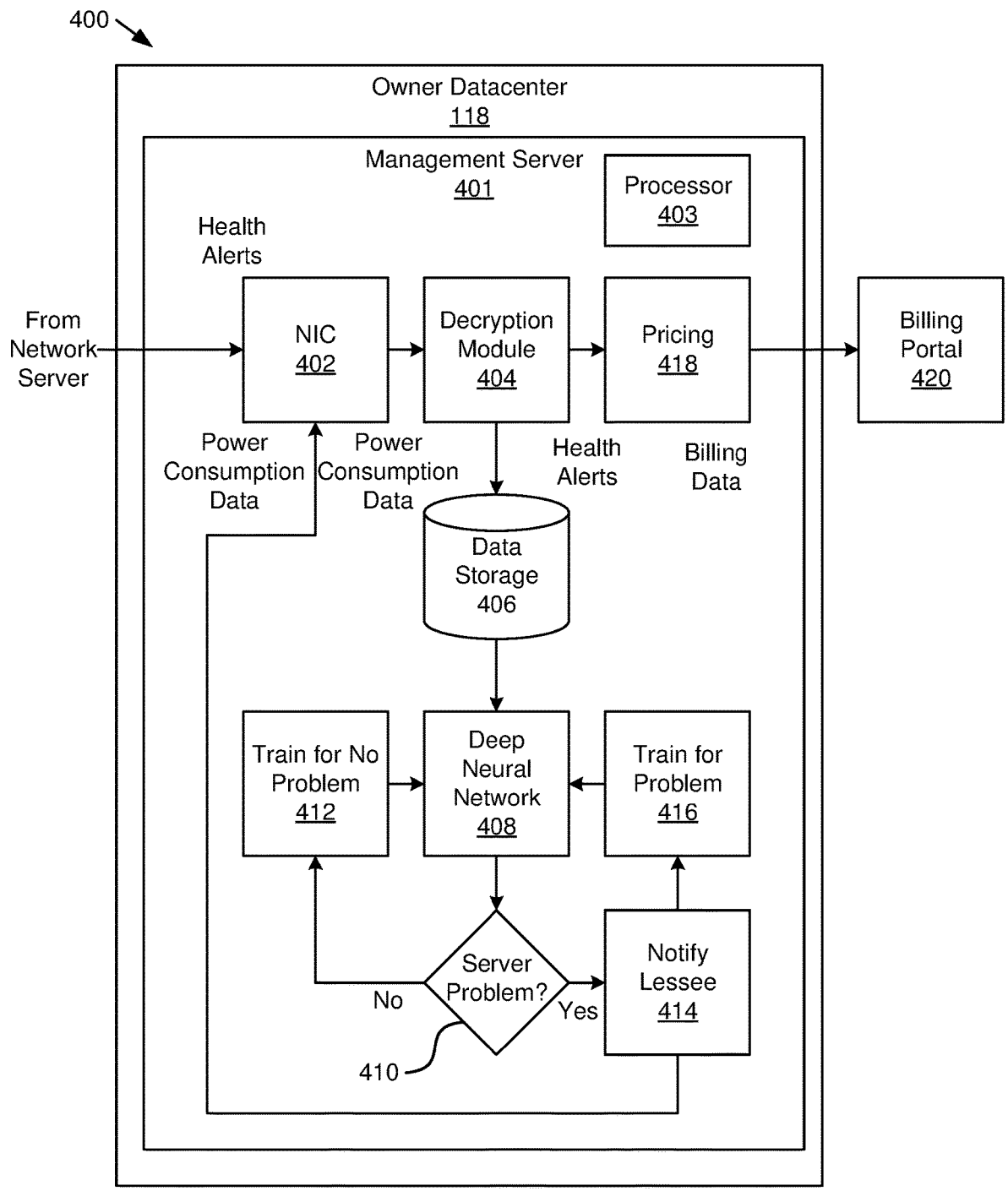
FIG. 4 is a schematic block diagram illustrating an apparatus/method for processing data consumption data and health alerts from remote servers and predicting server failures with a deep neural network, according to various embodiments.

FIG. 4 is a schematic block diagram illustrating one embodiment of an apparatus/method 400 for processing data consumption data 114 and health alerts from remote servers 102 and predicting server failures with a deep neural network. FIG. 4 includes both hardware elements and method steps for convenience and may be implemented with appropriate hardware and/or executable code running on a processor 403. The processor 403 and other elements depicted at the owner datacenter 118 may be implemented in a management server 401. While a NIC 402 and the data storage device 406 are hardware elements, controlling the NIC 402 and data storage on the data storage device 406, in some embodiments, is controlled with executable code executing on the processor 403 or may be implemented a programmable hardware device, such as an FPGA. Some of the depicted steps of the apparatus/method 400 may also be implemented with hardware circuits, such as routing data. One of skill in the art will recognize other ways to implement the apparatus/method 400

Figure 5:
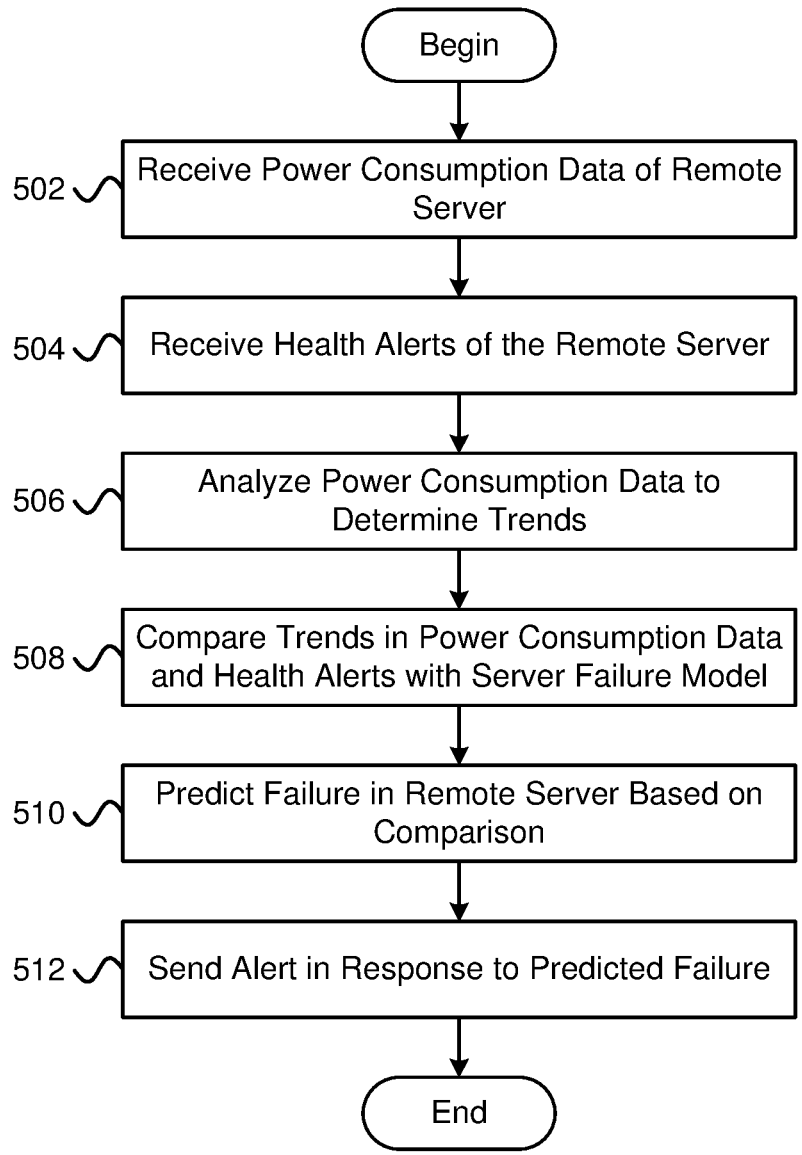
FIG. 5 is a schematic flow chart diagram illustrating a method for predicting server failures, according to various embodiments.
Figure 6:
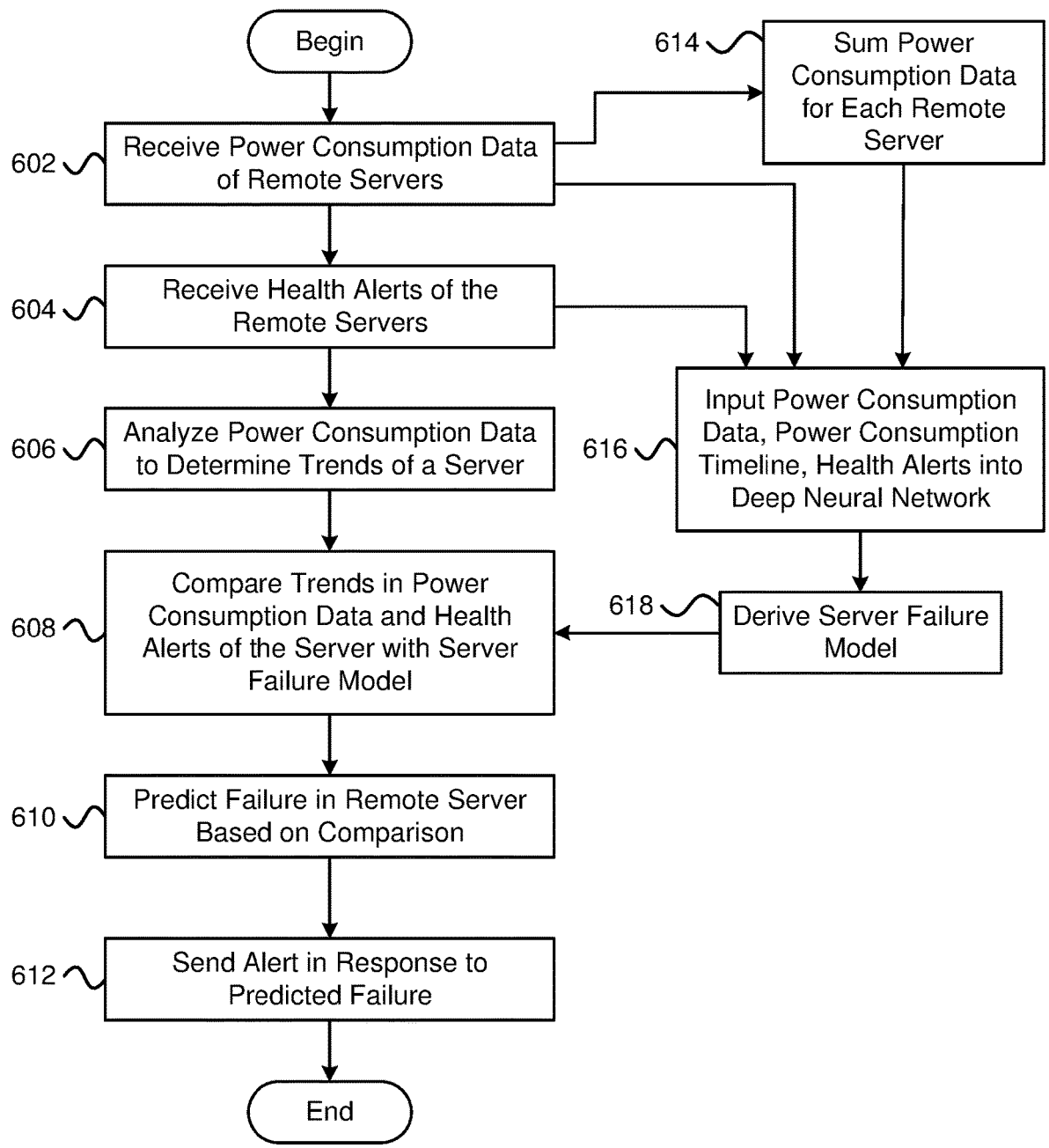
FIG. 6 is a schematic flow chart diagram illustrating a method for predicting server failures and billing based on power consumption data, according to various embodiments.

A NIC 402 in the owner datacenter 118 receives, over the computer network 120, encrypted power consumption data 114 from a controller manager 116 for a group of remote servers 102a-n. The NIC 402 also receives health alerts, which may also be encrypted. Note that while the embodiments depicted herein describe remote servers 102, the apparatuses and methods 400, 500, 600 of FIGS. 4, 5 and 6 are equally applicable to prediction of server failures for servers located anywhere, including servers of a datacenter where the apparatus/method 400 is located.

A decryption module 404 decrypts the power consumption data 114 and/or health alerts and stores the unencrypted power consumption data 114 and health alerts in a data storage device 406, which is typically non-volatile storage. The power consumption data 114 and health alerts are input to a deep neural network 408, which identifies 410 if there is a server problem with one of the remote servers 102 in the form of a server failure prediction. If there is not a server problem, the deep neural network 408 is trained 412 for a non-problem with a remote server 102. If the deep neural network 408 predicts a server problem, an alert module (not shown) notifies 414 the lessee of the predicted failure and the deep neural network 408 is trained 416 for a server problem.

The deep neural network 408 may also be called a neural network with deep learning and is loosely modeled after the human brain and is designed to recognize patterns. In some embodiments, the deep neural network 408 is trained using power consumption data 114 and health alerts of remote servers 102 of a same type to identify trends that precede a failure of a remote server 102 or a component of the remote server 102. In some embodiments, the deep neural network 408 is constructed using algorithms implemented in executable code. As power consumption data 114 and health alerts are input into the deep neural network 408, the deep neural network 408 refines identification of patterns that indicate failures within the remote servers 102

The power consumption data 114 is also processed to create billing data, which, in some embodiments, is sent to a billing portal 420 to create and send a bill to the lessee. For example, the billing portal 420 may include the NWaaS portal 124, which may be in a public cloud 126. In other embodiments, the billing data is processed at the owner datacenter 118, which generates and sends bills to the lessee.

FIG. 5 is a schematic flow chart diagram illustrating one embodiment of a method 500 for predicting server failures. The method 500 begins and receives 502 power consumption data 114 of a remote server 102 and receives 504 health alerts of the remote server 102. The method 500 may receive 502, 504 the power consumption data 114 and the health alerts over the computer network 120.

The method 500, in some embodiments, analyzes 506 the power consumption data 114 of the remote server 102 to determine trends in the power consumption data 114. For example, the method 500 may identify an unexpected power increase in a fan of the remote server 102, which may be indicative of an impending failure of the fan and may precede a health alert generated for the fan where the health alert may be temperature rise above a threshold. The method 500 may identify a trend of low power consumption by a data storage device, which may indicate that data is not being stored in the data storage device due to a fault or data storage failures in the data storage device. The method 500 may also identify other trends in the power consumption data which are expected, such as increased power consumption of a CPU that correlates with a load increase and power increases in other components, such as a fan cooling the CPU. One of skill in the art will recognize other trends in the power consumption data which can be used with health alerts to predict server failures.

The method 500 compares 508 the trends in the power consumption data 114 and the health alerts with a server failure model and predicts 510 a failure in the remote server 102 based on the comparison between the trends in the power consumption data 114 and the health alerts and the server failure model. The server failure model is derived from historical power consumption data 114 and health alerts associated with one or more servers of a same type as the remote server 102. Typically, a remote server 102 will have a failure model that is somewhat of a "U"-shaped curve with a lot of initial failures at startup, burn in, etc., followed by a low failure period, and then followed by a rise in server failures as the remote server 102 approaches an end of life.

Often, the U-shaped failure curve of a remote server 102 correlates with usage of the remote server 102 so that a remote server 102 that is used heavily will fail sooner than a remote server 102 that is lightly used on average. The server failure model is typically most applicable when derived from servers of a same or similar type as the remote server 102. The method 500 sends 512 an alert in response to the predicted failure, the alert indicating the predicted failure, and the method 500 ends. The method 500, in some embodiments, uses the deep neural network 408, the data storage device 406, the NIC 402, etc. of the apparatus/method 400 of FIG. 4 along with power consumption data 114 from the measurement circuit 202 and other devices of the apparatus 200 of FIG. 2 and the apparatus 300 and method 301 of FIG. 3.

FIG. 6 is a schematic flow chart diagram illustrating one embodiment of a method 600 for predicting server failures and billing based on power consumption data 114. The method 600 begins and receives 602 power consumption data 114 of remote servers 102 and receives 604 health alerts of the remote servers 102. In some embodiments, the power consumption data 114 and health alerts are decrypted with the decryption module 404 and stored in the data storage device 406.

The method 600, in some embodiments, analyzes 606 the power consumption data 114 of the remote server 102 to determine trends in the power consumption data 114, and compares 608 the trends in the power consumption data 114 and the health alerts with a server failure model and predicts 610 a failure in the remote server 102 based on the comparison between the trends in the power consumption data 114 and the health alerts and the server failure model. The method 600 sends 612 an alert in response to the predicted failure, the alert indicating the predicted failure, and the method 600 ends. In some embodiments, the steps 602-612 of the method 600 of FIG. 6 are substantially similar to the steps 502-512 of the method 500 of FIG. 5 and may also use the same devices, hardware, etc. of the method 500 of FIG. 5.

The method 600, in some embodiments, sums 614 power consumption data 114 for each remote server 102 by combining the power consumption data 114 of a remote server (e.g. 102a) with previous power consumption data 114 to determine a current total power consumption of the remote server 102a. Predicting 610 a failure in the remote server 102a, in some embodiments, is based on the current total power consumption of the remote server 102a. For example, as described with regard to FIG. 7, power consumption of a remote server 102 is correlated with CPU utilization. CPU utilization is correlated with server failure so that a server that has a high CPU utilization generally fails sooner than a server with a lower CPU utilization. Thus, keeping track of total power consumption of a remote server 102 can be used by the deep neural network 408 in predicting a server failure. In some embodiments, the server failure model uses total power consumption instead of time or CPU utilization to correlate with current power consumption data and current health alerts for server failure prediction. Thus, trends in power consumption data 114, health alerts, etc. can be tied to an "age" of a remote server 102 where the "age" is in terms of total power usage of the remote server 102.

The method 600 inputs 616 power consumption data 114, total power consumption of each remote server (e.g. 102a-n), and health alerts into the deep neural network 408 and the method 600 derives 618 the server failure model that is compared 608 with trends in power consumption data 114 and health alerts. In other words, the deep neural network 408 is trained using the power consumption data 114, total power consumption of each remote server 102a-n and/or health alerts. Deep neural networks, in general, are built to identify trends and patterns. The deep neural network 408 is trained to identify trends and patterns before a failure of various components of the remote servers 102. In some embodiments, the method 600 starts with an initial server failure model and updates the server failure model based on the input health alerts, power consumption data 114 and total power consumption of each remote server 102.

Adding power consumption data 114 to a failure prediction analysis provides additional data to more accurately predict server failures. Power consumption trends along with health alerts in a deep neural network provide a mechanism to identify failures in components of a server sooner than just using health alerts alone. For example, certain trends in power consumption of a component may indicate an impending component failure before a health alert. In a particular example, bearings in a fan may start to degrade and may cause an increase in power consumption prior to a temperature rise in the fan high enough to pass a threshold and cause a health alert, and before the fan stops, which will trigger a health alert indicating fan failure. The deep neural network 408 can be trained based on a trend of increased power consumption in the fan, followed by an overtemperature health alert and/or a fan failure health alert so that the deep neural network 408 is able to issue a fan failure prediction earlier than the fan overtemperature health alert. This earlier prediction is valuable so that a network administrator can possibly order and replace the fan before actual fan failure and consequences of the fan failure to other components cooled by the fan or affected by a fan failure. The deep neural network 408 can identify how trends in power consumption increases and decreases relate, along with related health alerts, to server failures.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. A method comprising:
   receiving, at a server and at a data transmission rate, power consumption data of a remote server used by a customer, wherein the power consumption data was measured by a controller at the remote server at a power sampling rate that is more frequent than the data transmission rate;

deriving a power-utilization correlation between power consumption of the remote server with utilization of the remote server;

determining utilization of the remote server from the power consumption data and the power-utilization correlation;

preparing a bill for the customer based on the determined utilization of the remote server; and making the bill available to the customer.

2. The method of claim 1, wherein deriving the power-utilization correlation comprises:

compiling power consumption data and corresponding utilization data for the remote server; and correlating the remote server utilization data with the power consumption data.

3. The method of claim 2, wherein correlating the remote server utilization data with the power consumption data comprises:

determining power consumption of the remoter server during a no load condition;

determining power consumption of the remote server during a fully loaded condition; and constructing an equation for remote server utilization between a minimum utilization and a maximum utilization of the remote server, wherein the minimum utilization correlates with the power consumption of the remote server at the no load condition, and wherein the maximum utilization correlates with the power consumption of the remote server at the fully loaded condition.

4. The method of claim 3, wherein the equation for remote server utilization is constructed using a curve fitting algorithm selected to match the correlation between the remote server utilization data and the power consumption data.

5. The method of claim 3, wherein the equation for remote server utilization is:

$$P_{current} = P_{idle} + (P_{busy} - P_{idle})u$$

where:

$P_{current}$ is an amount of power consumption of the remote server at a particular point in time;

$P_{idle}$ is the power consumption of the remoter server during the no load condition;

$P_{busy}$ is the power consumption of the remote server during the fully loaded condition; and u is the utilization of the remote server at the particular point in time of $P_{current}$.

6. The method of claim 3, wherein the equation for remote server utilization is:

$$P_{current} = P_{idle} + (P_{busy} - P_{idle})(2u - u^r)$$

where:

$P_{current}$ is an amount of power consumption of the remote server at a particular point in time;

$P_{idle}$ is the power consumption of the remoter server during the no load condition;

$P_{busy}$ is the power consumption of the remote server during the fully loaded condition;

u is the utilization of the remote server at the particular point in time of $P_{current}$; and r is a number selected so that the equation for the remote server utilization matches the correlation between the remote server utilization data and the power consumption data using a curve fitting algorithm.

7. The method of claim 3, further comprising using the equation for remote server utilization and the received power consumption data of the remote server to derive utilization of the remote server over a billing period and deriving the bill based on the utilization during the billing period.

8. The method of claim 1, wherein receiving the power consumption data further comprises decrypting the power consumption data and storing the power consumption data in a computer readable storage device accessible for at least determining utilization of the remote server from the power consumption data and the power-utilization correlation.

9. The method of claim 1, wherein storing the power consumption data is in a first-in/first-out ("FIFO") buffer, wherein the FIFO buffer comprises a capacity to store measurements of power consumption data for a time period at least twice as much as the data transmission rate.

10. An apparatus comprising:

a processor;

non-transitory computer readable storage media that stores code executable by the processor to:

receive, at a data transmission rate, power consumption data of a remote server used by a customer, wherein the power consumption data was measured by a controller at the remote server at a power sampling rate that is more frequent than the data transmission rate;

derive a power-utilization correlation between power consumption of the remote server with utilization of the remote server;

determine utilization of the remote server from the power consumption data and the power-utilization correlation;

prepare a bill for the customer based on the determined utilization of the remote server; and make the bill available to the customer.

11. The apparatus of claim 10, wherein deriving the power-utilization correlation comprises:

compiling power consumption data and corresponding utilization data for the remote server; and correlating the remote server utilization data with the power consumption data.

12. The apparatus of claim 11, wherein correlating the remote server utilization data with the power consumption data comprises:

determining power consumption of the remoter server during a no load condition;

determining power consumption of the remote server during a fully loaded condition; and constructing an equation for remote server utilization between a minimum utilization and a maximum utilization of the remote server, wherein the minimum utilization correlates with the power consumption of the remote server at the no load condition, and wherein the maximum utilization correlates with the power consumption of the remote server at the fully loaded condition.

13. The apparatus of claim 12, wherein the equation for remote server utilization is constructed using a curve fitting algorithm selected to match the correlation between the remote server utilization data and the power consumption data.

14. The apparatus of claim 12, wherein the equation for remote server utilization is:

$$P_{current} = P_{idle} + (P_{busy} - P_{idle})u$$

where:
- $P_{current}$ is an amount of power consumption of the remote server at a particular point in time;
- $P_{idle}$ is the power consumption of the remoter server during the no load condition;
- $P_{busy}$ is the power consumption of the remote server during the fully loaded condition; and
- u is the utilization of the remote server at the particular point in time of $P_{current}$.

15. The apparatus of claim 12, wherein the equation for remote server utilization is:

$$P_{current}=P_{idle}+(P_{busy}-P_{idle})(2u-u^r)$$

where:
- $P_{current}$ is an amount of power consumption of the remote server at a particular point in time;
- $P_{idle}$ is the power consumption of the remoter server during the no load condition;
- $P_{busy}$ is the power consumption of the remote server during the fully loaded condition;
- u is the utilization of the remote server at the particular point in time of $P_{current}$; and
- r is a number selected so that the equation for the remote server utilization matches the correlation between the remote server utilization data and the power consumption data using a curve fitting algorithm.

16. The apparatus of claim 12, further comprising using the equation for remote server utilization and the received power consumption data of the remote server to derive utilization of the remote server over a billing period and deriving the bill based on the utilization during the billing period.

17. A program product comprising a non-transitory computer readable storage medium that stores code executable by a processor, the executable code comprising code to:
  receive, at a server and at a data transmission rate, power consumption data of a remote server used by a customer, wherein the power consumption data was measured by a controller at the remote server at a power sampling rate that is more frequent than the data transmission rate;
  derive a power-utilization correlation between power consumption of the remote server with utilization of the remote server;
  determine utilization of the remote server from the power consumption data and the power-utilization correlation;
  prepare a bill for the customer based on the determined utilization of the remote server; and
  make the bill available to the customer.

18. The program product of claim 17, wherein deriving the power-utilization correlation comprises:
  compiling power consumption data and corresponding utilization data for the remote server; and
  correlating the remote server utilization data with the power consumption data.

19. The program product of claim 18, wherein correlating the remote server utilization data with the power consumption data comprises:
  determining power consumption of the remoter server during a no load condition;
  determining power consumption of the remote server during a fully loaded condition; and
  constructing an equation for remote server utilization between a minimum utilization and a maximum utilization of the remote server,
  wherein the minimum utilization correlates with the power consumption of the remote server at the no load condition,
  wherein the maximum utilization correlates with the power consumption of the remote server at the fully loaded condition, and
  wherein the equation for remote server utilization is constructed using a curve fitting algorithm selected to match the correlation between the remote server utilization data and the power consumption data.

* * * * *